US012592507B2

(12) United States Patent
Tang

(10) Patent No.: US 12,592,507 B2
(45) Date of Patent: Mar. 31, 2026

(54) HIGH FREQUENCY RECEPTACLE FOR CABLE TV PIN CONNECTOR

(71) Applicant: Antronix Inc., Cranbury, NJ (US)

(72) Inventor: Neil H. Tang, Princeton, NJ (US)

(73) Assignee: Antronix Inc., Cranbury, NJ (US)

( * ) Notice: Subject to any disclaimer, the term of this patent is extended or adjusted under 35 U.S.C. 154(b) by 313 days.

(21) Appl. No.: 18/188,885

(22) Filed: Mar. 23, 2023

(65) Prior Publication Data

US 2023/0307858 A1 Sep. 28, 2023

Related U.S. Application Data

(60) Provisional application No. 63/324,341, filed on Mar. 28, 2022.

(51) Int. Cl.
*H01R 13/187* (2006.01)
*H01R 24/50* (2011.01)

(52) U.S. Cl.
CPC ........... *H01R 13/187* (2013.01); *H01R 24/50* (2013.01); *H01R 2201/18* (2013.01)

(58) Field of Classification Search
None
See application file for complete search history.

(56) References Cited

U.S. PATENT DOCUMENTS 1,181,742 A 5/1916 Coolidge
1,658,713 A 2/1928 Fuller
D137,705 S 4/1944 Drury
2,796,495 A 6/1957 William et al.
D223,109 S 3/1972 Murphy
6,081,169 A * 6/2000 Romerein .............. H04N 7/104 333/100
6,129,597 A * 10/2000 Gresko .................. H01R 24/52 439/583
6,133,939 A * 10/2000 Gresko .................. H04N 7/104 725/127
6,267,622 B1 7/2001 Nagata
6,390,829 B1 * 5/2002 Rademacher ...... H01R 12/7076 439/810
6,593,830 B2 * 7/2003 Wu ........................ H01R 24/46 725/127

(Continued)

FOREIGN PATENT DOCUMENTS

CA 215932 S 10/2024
CA 233830 S 2/2025
CA 236550 S 2/2025

OTHER PUBLICATIONS

MM, date referenced: Aug. 13, 2020, data retrieved by Bryan Melvin on Sep. 25, 2025 at: https://www.mill-max.com/engineering-notebooks/machined-pin-pcb-connectors-interconnects (Year: 2020).

(Continued)

*Primary Examiner* — Ross N Gushi
(74) *Attorney, Agent, or Firm* — Volpe Koenig

(57) ABSTRACT

A pin connector receptacle for use with cable TV pin connectors is described. The receptacle has a cylindrical base that can accept a pin of a pin connector from any of four quadrants. The pin connector has a spring-loaded connection plate that grips a pin of a pin connector firmly in place against the cylindrical base.

10 Claims, 10 Drawing Sheets

(56) References Cited

U.S. PATENT DOCUMENTS

| | | | | |
|---|---|---|---|---|
| 7,086,078 | B1 * | 8/2006 | Gresko | H04N 7/104 725/127 |
| 7,318,756 | B2 * | 1/2008 | Mahoney | H01R 13/2421 439/700 |
| 7,625,247 | B1 * | 12/2009 | Mahoney | H01R 9/0527 439/700 |
| 7,807,935 | B2 * | 10/2010 | Tang | H01R 24/46 333/100 |
| 7,814,653 | B2 * | 10/2010 | Pfister | H01R 13/5219 439/700 |
| 7,941,918 | B2 * | 5/2011 | Pfister | H01R 4/489 439/700 |
| D708,139 | S | 7/2014 | Yoo et al. | |
| 9,065,185 | B2 * | 6/2015 | Magnezi | H01R 9/0506 |
| 9,661,263 | B2 * | 5/2017 | Chang | H04N 7/104 |
| 10,218,123 | B1 * | 2/2019 | Mahoney | G02B 6/3817 |
| D863,222 | S | 10/2019 | Kimmel | |
| D880,423 | S | 4/2020 | Obata et al. | |
| D881,818 | S | 4/2020 | Obata et al. | |
| 11,158,971 | B2 * | 10/2021 | Ivancic | H01R 13/2421 |
| 11,404,817 | B2 * | 8/2022 | Jacobson | H04Q 11/00 |
| 11,456,566 | B2 * | 9/2022 | Mahoney | H01R 13/642 |
| 11,515,654 | B2 * | 11/2022 | Chapman | H01R 24/547 |
| 11,522,324 | B2 * | 12/2022 | Lin | H01R 13/502 |
| 12,095,208 | B2 * | 9/2024 | Mahoney | H01R 13/17 |
| D1,055,865 | S | 12/2024 | Joshi et al. | |
| 12,224,520 | B2 * | 2/2025 | Lozhko | H01R 24/54 |
| D1,065,091 | S | 3/2025 | Somanath et al. | |
| 2012/0274412 | A1 * | 11/2012 | Lee | H01R 13/719 333/32 |
| 2016/0365686 | A1 * | 12/2016 | Lu | H01R 24/38 |
| 2023/0307878 | A1 * | 9/2023 | Tang | H01R 9/0506 |
| 2025/0120023 | A1 * | 4/2025 | Chen | H05K 5/03 |

OTHER PUBLICATIONS

CS, date referenced: Sep. 1, 2022, data retrieved by Bryan Melvin on Sep. 25, 2025 at: https://connectorsupplier.com/meet-the-connector-coaxial-connectors/ (Year: 2022).

* cited by examiner

HIGH FREQUENCY RECEPTACLE FOR CABLE TV PIN CONNECTOR

CROSS REFERENCES

This U.S. Non-Provisional patent application claims priority of U.S. Provisional Patent Application No. 63/324,341, filed on Mar. 28, 2022, the entire contents of which are hereby incorporated by reference.

TECHNICAL FIELD

This disclosure generally relates to high frequency coaxial cable interconnection devices.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In cable TV and other RF coaxial cable distribution systems, a main distribution cable is used bring video, telephony, and data to a customers' facility. The main distribution cable often uses specialized pin connectors to reliably connect devices to the main distribution cable. These devices include optical nodes to convert an optical signal to RF signal, RF amplifiers to amplify low signals, filters to optimize a RF frequency response, and multi-taps and splitters to divide the RF signal to multiple outputs.

As the bandwidth of the RF coaxial cable distribution system increases, the receptacle for receiving the specialized pin connector needs to be improved for usable frequencies to 1.8 GHz and beyond. Devices in current use have a seizure screw to compress perpendicularly and contact the specialized pin connector. These receptacles have a frequency limitation and are often not usable at higher frequencies due to the inherent capacitance of the interconnect that causes undesired signal attenuation and reflection at high frequencies.

Additionally, the RF coaxial cable distribution system can be an aerial cable where the main distribution cable is attached to telephone poles or an underground cable where the main distribution cable is buried underground. In an aerial cable distribution system, the connection points to the device is typically in a horizontal orientation where the distribution cable is in-line with the device. In an underground cable distribution system, the connection point to the device is typically in a vertical orientation where the buried distribution cable comes up to the surface and is connected to the device input and continues down underground through the device output. The device in the underground installation is typically enclosed in a protective enclosure box located on the property of a customer.

Prior art uses RF connectors for some of this interface but is more expensive. The present invention provides a low cost, high frequency receptacle contact for cable TV pin connectors with a bandwidth of 3 GHz or higher and provides a receptacle contact that can accommodate aerial and underground installation with a single receptacle contact.

DETAILED DESCRIPTION

According to the techniques of this disclosure, there is described herein a coaxial cable pin receptacle suitable for high frequency and high power signals.

Figure 1:
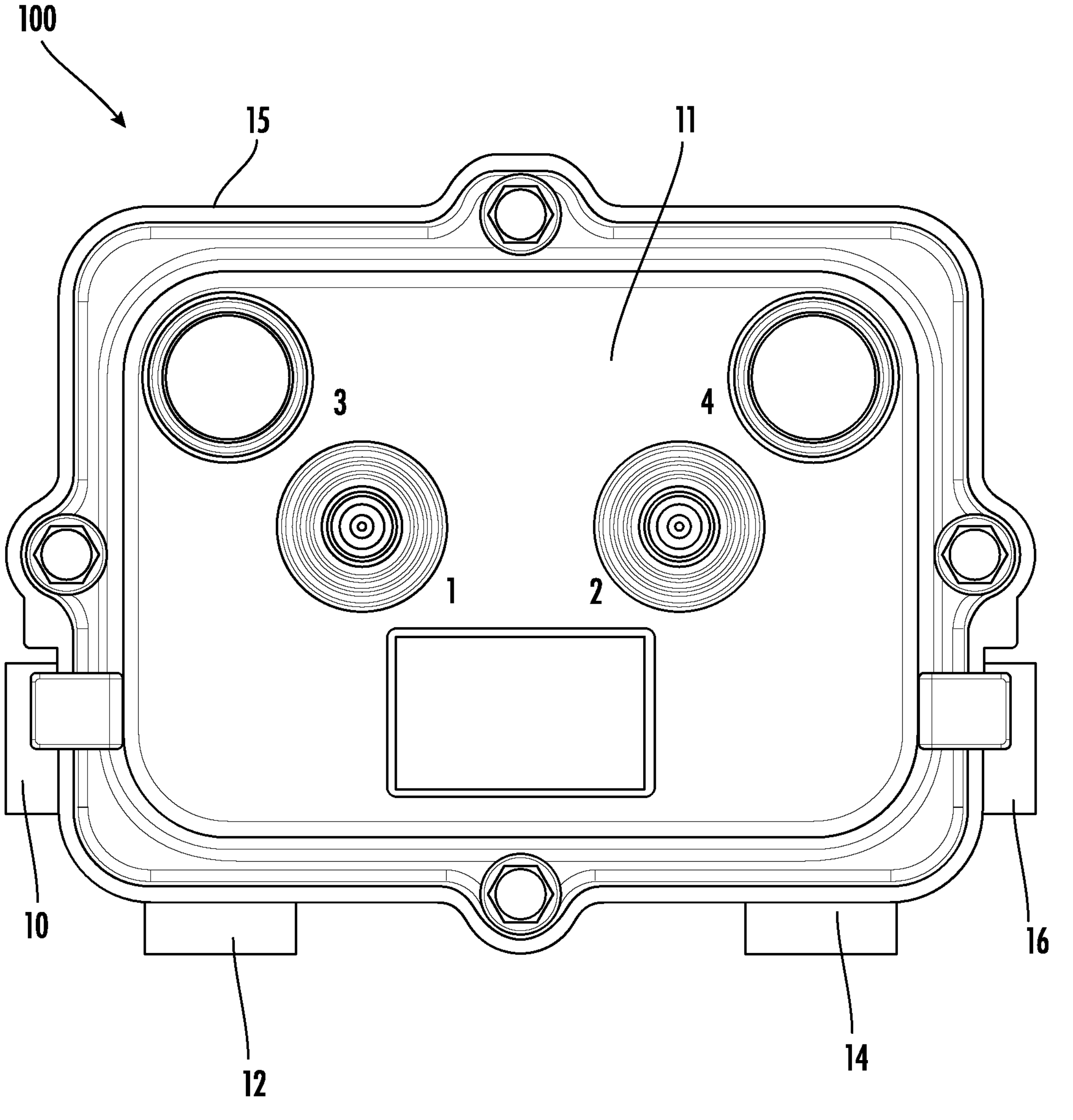
FIG. 1 is a drawing of a multi-tap coaxial cable junction box according to an aspect of the invention.

FIG. 1 shows an example multi-tap device 100 according to an aspect of the invention. The multi-tap 100 includes four main-line coaxial connector input ports 10, 12, 14, and 16, a cover plate 11, and multi-tap housing 15. The threaded ports are arranged to accept standard ⅝-24 male coaxial connectors for a main cable (not shown). In a typical above ground installation, a main cable is connected to ports 10 and 16. In an underground installation where the cables rise vertically up to the multi-tap 100, ports 12 and 14 are used. Internally, ports 10 and 12 are electrically connected to each other and ports 14 and 16 are electrically connected to each other. Each of these two pairs of ports is generally connected to a printed circuit board, which may include electronic components and connections to customer ports on the cover shown labeled 1, 2, 3 and 4. As can be seen from FIG. 1, a single receptacle inside the multi-tap may be arranged to receive a coaxial connector from either port 10 or port 12. Likewise, a second single receptacle may be arranged to receive a coaxial connector from either port 14 or 16.

Figure 2:
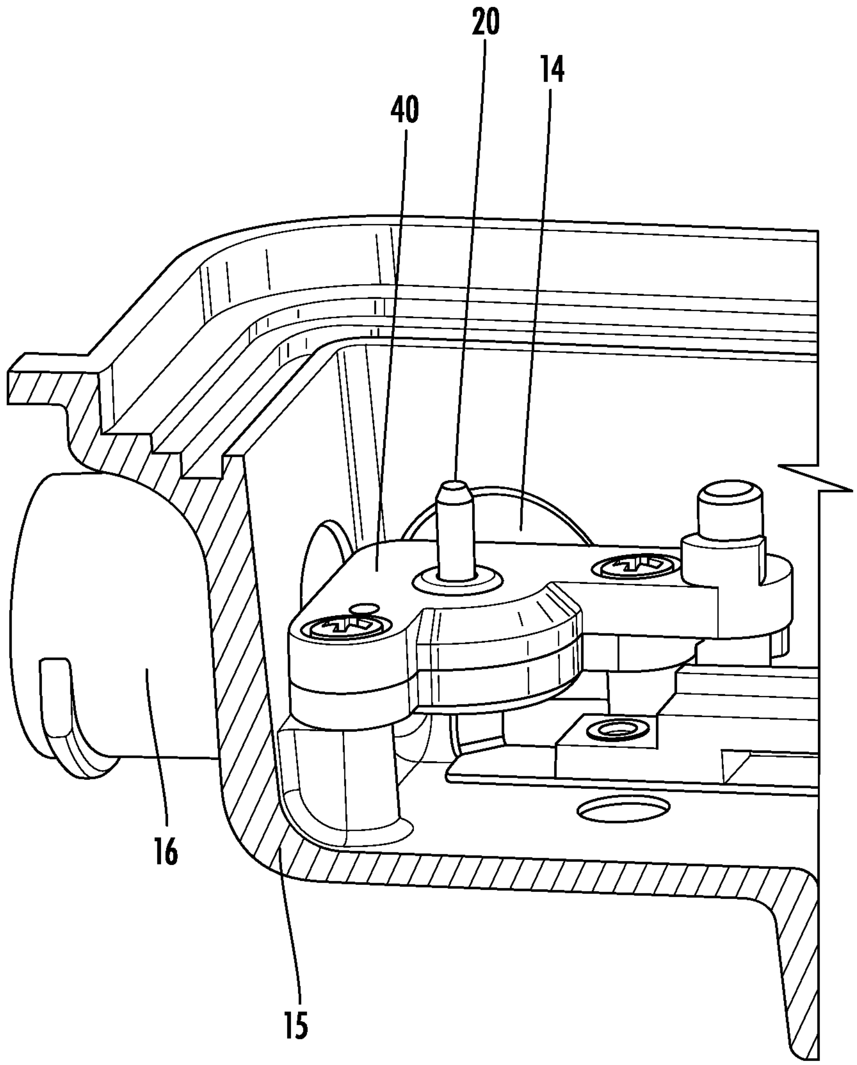
FIG. 2 is a cross-sectional drawing of a portion of the interior of a multi-tap coaxial cable junction box according to an aspect of the invention.

FIG. 2 shows an example pin connection receptacle 20 according to an aspect of the invention in an example in a receptacle housing 40. The view is a cross section view of the inside of a multi-tap housing 15, such as the multi-tap 100 shown in FIG. 1. The receptacle, which will be shown and described in more detail in further figures, can receive a coaxial pin connector from either of ports 14 or 16.

Figure 3:
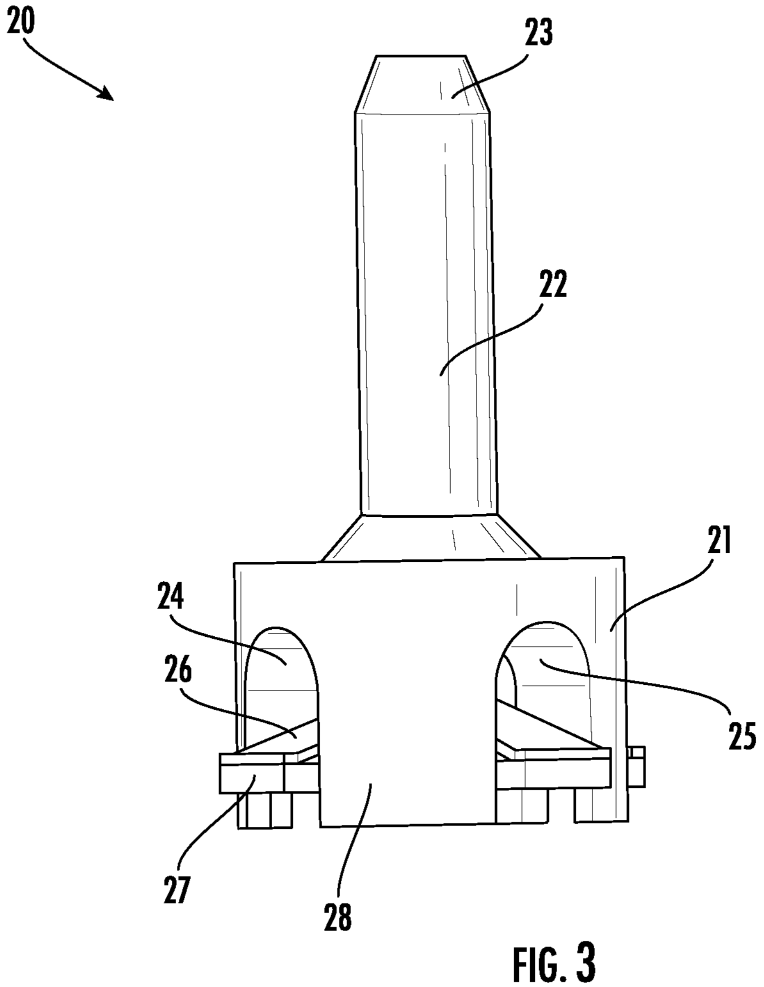
FIG. 3 is a drawing of an example pin receptacle according to an aspect of the invention.

FIG. 3 show an example high frequency pin receptacle 20 according to an aspect of the invention. Portions 22 and 21 of the receptacle are generally cylindrical, which will be seen more clearly in further figures described below. The receptacle 20 comprises three components: a base 21, which includes a cylindrical shaft 22 having a tapered top portion 23, flexible connection plate 26, and a connection plate cover 27. The connection plate cover 27 may be held in place by bending each of the ends of four "legs" of the base 21*a*, 21*b*, 21*c* and 21*d* inward. The connection plate cover may also be soldered to the base 21 or affixed with epoxy of other adhesives, which may be electrically conductive adhesives. There are four openings, 24, 24*a*, 25, 25*a*, in the receptacle base, two of which (24, 25) can be seen in this view.

Figure 4:
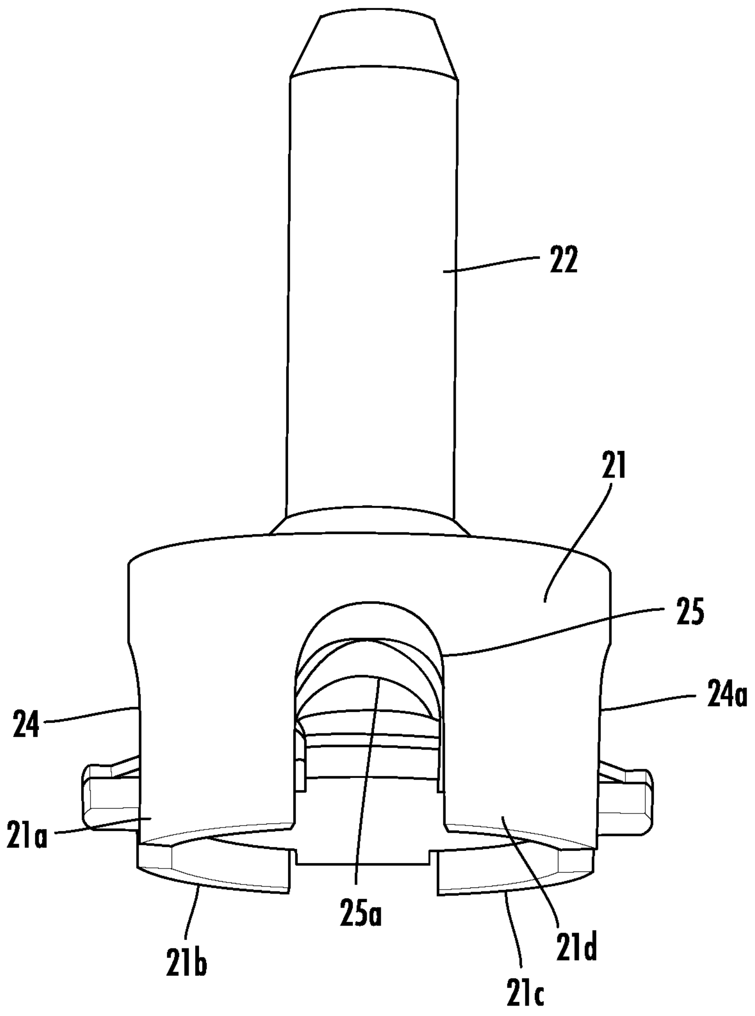
FIG. 4 is a further drawing of an example pin receptacle according to an aspect of the invention.
Figure 5:
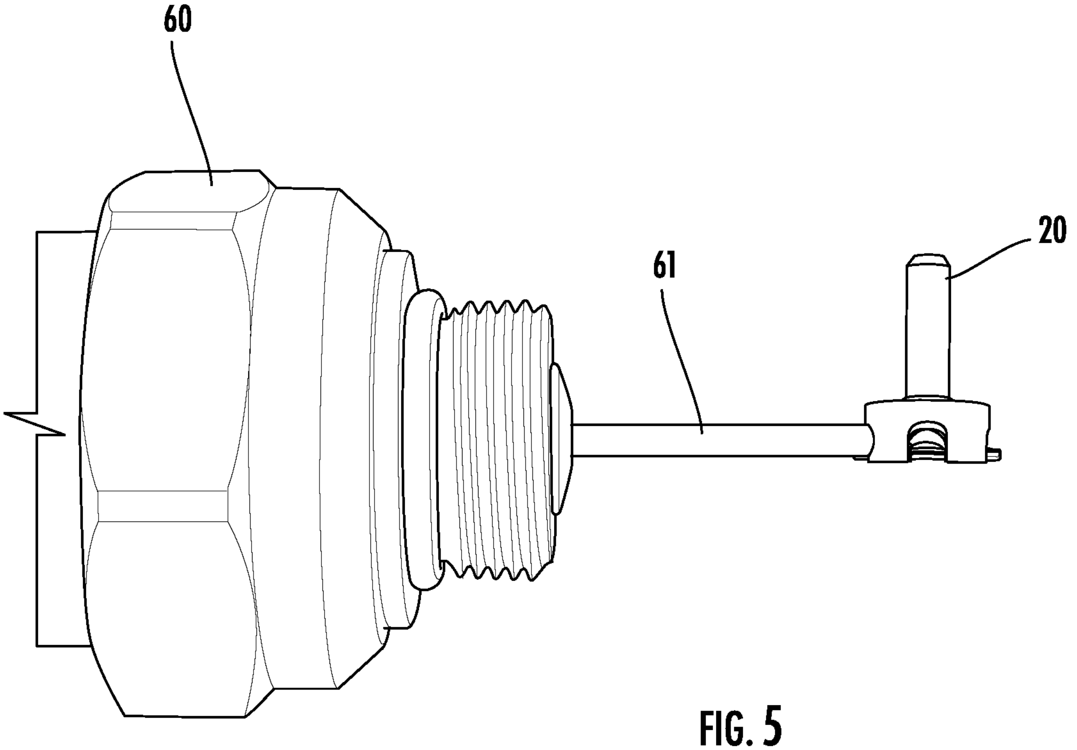
FIG. 5 is a drawing of an example pin receptacle with a coaxial cable connector pin inserted, according to an aspect of the invention.
Figure 6:
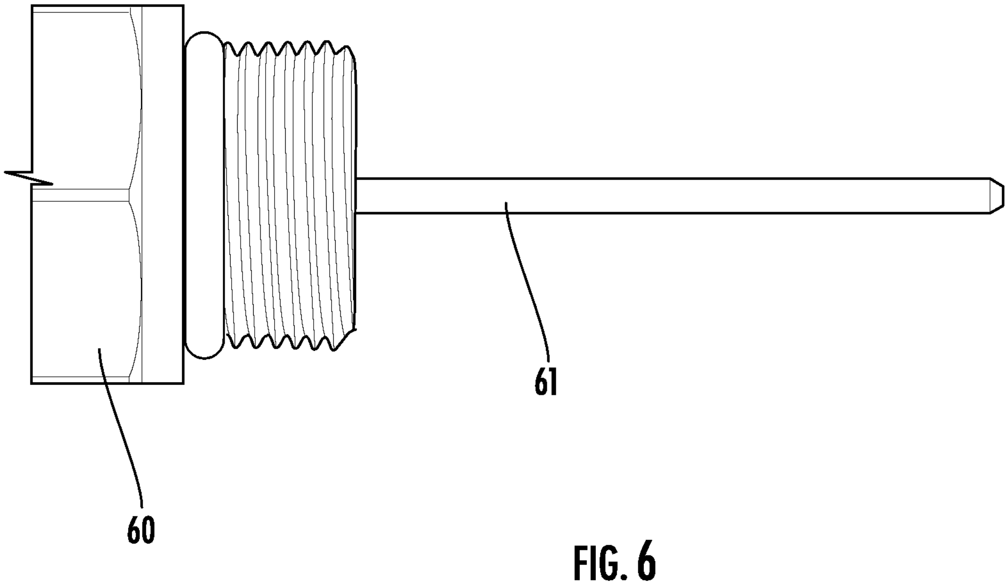
FIG. 6 is a drawing of a coaxial cable connector.

FIG. 4 shows another view of the example high frequency pin receptacle of FIG. 3. In this view, it can be more clearly seen that opposite opening 24 is opening 24*a* and that opposite opening 25 is opening 25*a*. The interior of the base 21 is open to allow a coaxial cable pin to go all the way through the base from, for example opening 24 to 24*a*, or from opening 25 to 25*a*. This can be seen in FIG. 5, which shows a coaxial connector 60 with pin 61 inserted into an example receptacle 20 according to an aspect of the invention. FIG. 6 is a line drawing of a coaxial pin connector 60 such as the one shown in FIG. 5.

Figure 7:
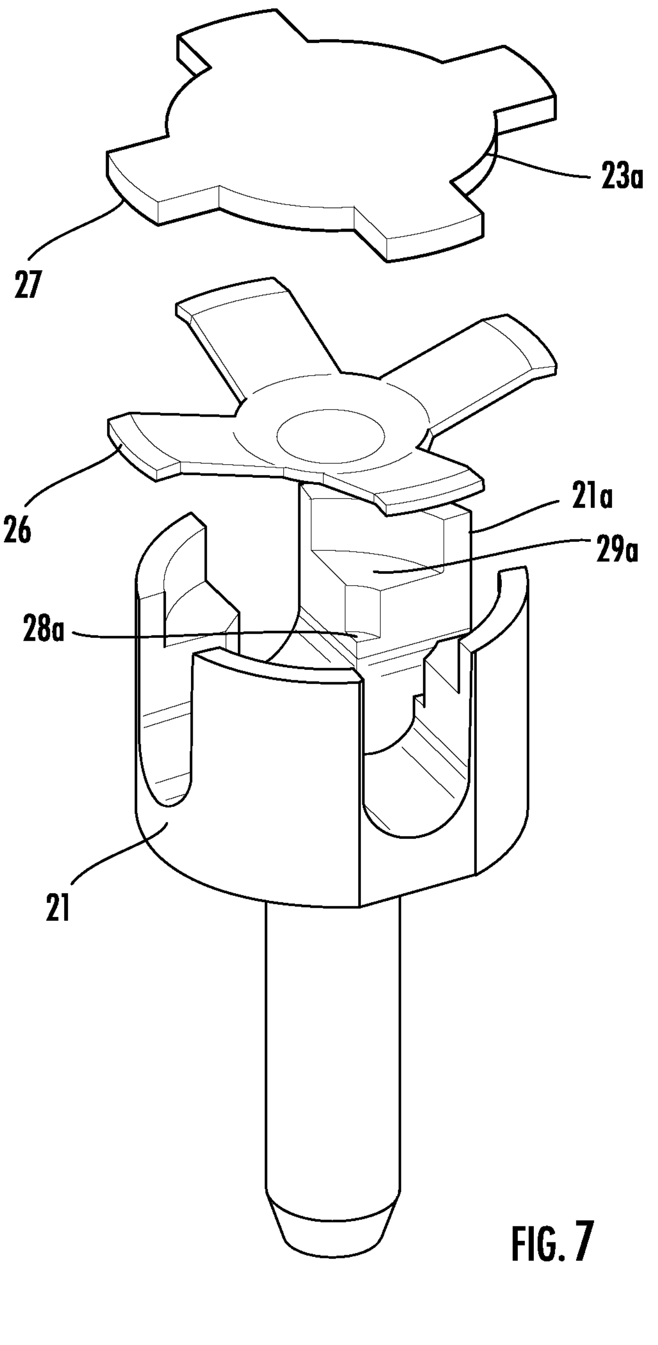
FIG. 7 is an exploded view drawing of an exemplary pin receptacle according to an aspect of the invention.

FIG. 7 is an exploded view of an example receptacle 20 showing the base 21, the flexible connection plate 26 and the connection plate cover 27. Also visible in FIG. 7 are two ledges 28*a*, 29*a* in base leg 21*a*. Each of the four base legs 21*a*, 21*b*, 21*c*, 21*d* has two such ledges. The four smaller ledges, of which 28*a* is one, limit the position of the connection plate 26. The four larger ledges, of which 29*a* is one, limit the position of the connection plate cover 27 and contact the connection plate cover at the center portion 27*e*

Figure 8:
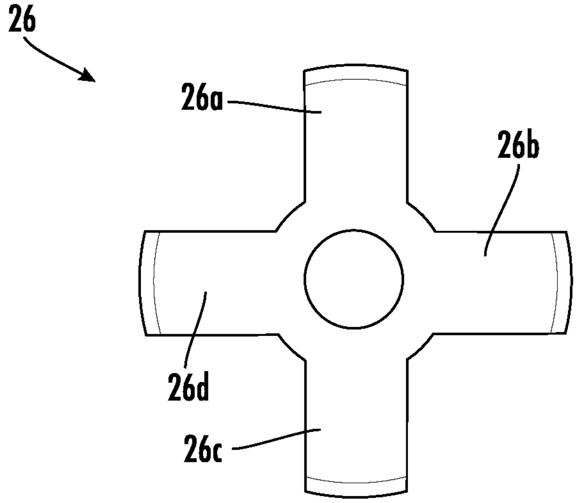
FIG. 8 is a drawing of a connection plate element of an exemplary pin receptacle according to an aspect of the invention.

FIG. 8 is a dimensioned top and side view of an example connection plate 26, with tabs 26*a*, 26*b*, 26*c*, 26*d*. The connection plate may be made of beryllium copper comprising upwards bend in the four tabs 26*a*, 26*b*, 26*c* and 26*d* so that the plate acts like a spring and is flexed downward when a coaxial pin connector is inserted in the receptacle 20. The connection plate may be heat treated to maintain a resilient spring-like force which is applied to the coaxial cable pin connector pin 61, forcing the pin 61 into the base 21 of the receptacle 20.

Figure 9:
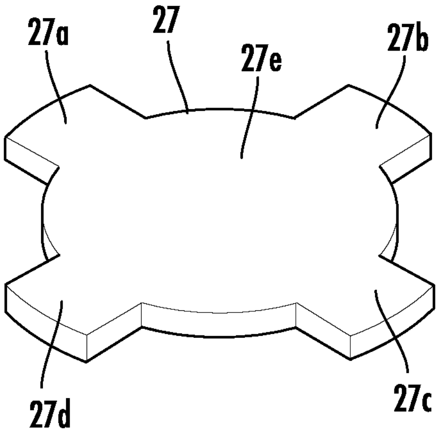
FIG. 9 is a drawing of a connection plate cover element of an exemplary pin receptacle according to an aspect of the invention.

FIG. 9 is a drawing of an example connection plate cover 27, showing connection plate cover tabs 27*a*, 27*b*, 27*c*, 27*d*.

Figure 10:
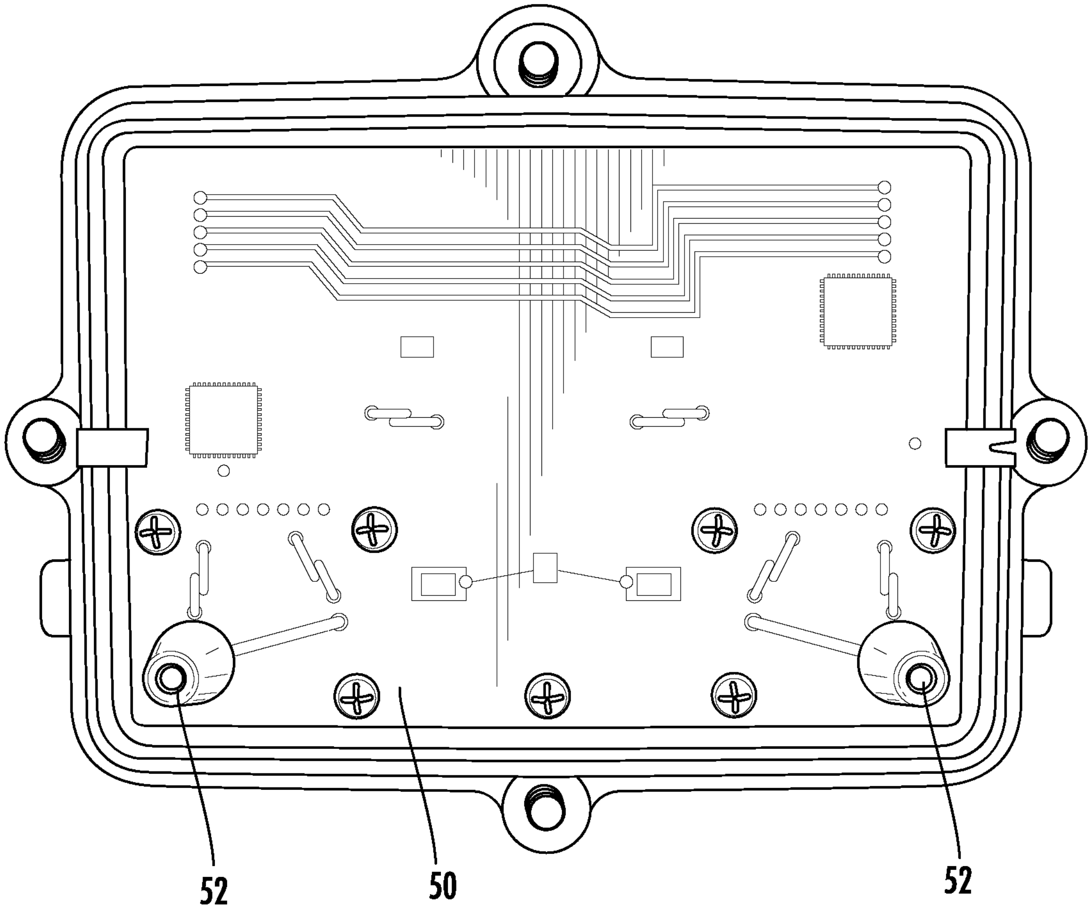
FIG. 10 is a drawing of a printed circuit board located inside the cover of the multi-tap coaxial cable junction box of FIG. 1.

FIG. 10 shows an example printed circuit board 50 on the inside of a multi-tap cover plate 11. The back side of the printed circuit board 50 faces the outside of the cover plate and customer cable connectors on the cover plate connect to the printed circuit board 50 from the back side of the board. The printed circuit board has two sockets 52 to accept pins 22 of receptacles 20 such as are described herein. When the cover plate 11 is installed on the housing 15, the two sockets 52 connect to the pins 22 of receptacle connectors 20, which, in turn connect to the main line cable ports (10, 12, 14, 16). In this manner, the pins 22 of receptacles 20 connect coaxial cable connector pins 61 to other circuitry in the multi-tap box 100. Thus, it can be understood that the receptacles described herein form a critical junction between the main-line coaxial cables and circuitry in the multi-tap box, as well as to any customer cable connectors that are connected to the multi-tap box.

Because of the critical nature of the electrical connection made by the receptacle 20, the pin receptacle is designed to have a minimum of 1000-1500 grams of pull force (gripping force to pull out a pin from the contact) to ensure a reliable connection. The pin needs to support 15 to 20 amperes of AC power. Material must, therefore, be selected to avoid corrosion and have minimum contact resistance. The contact area with the coaxial connector pin 61 is roughly the diameter of the central portion of the flexible connection plate 26, which in an example shown in FIG. 8, is 2.1 mm.

Figure 11:
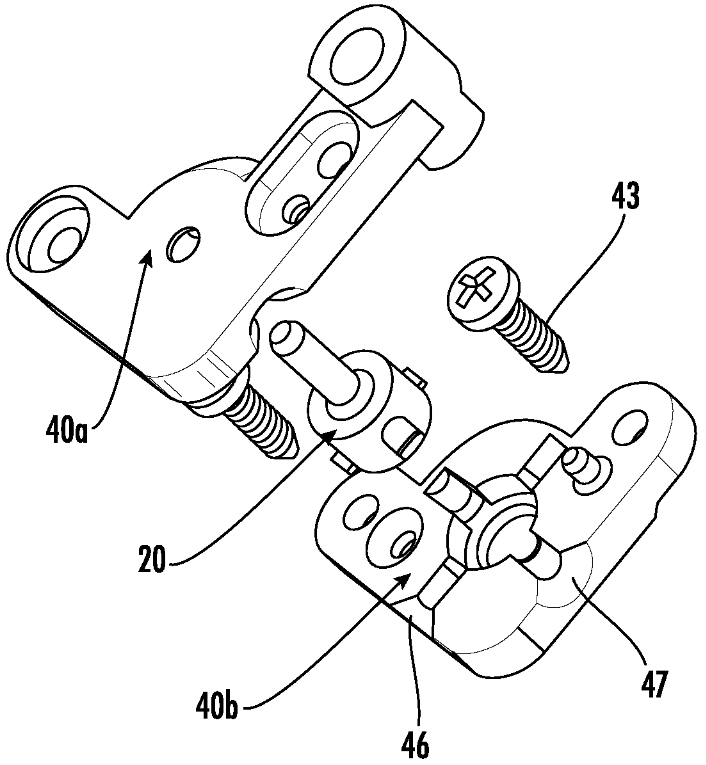
FIG. 11 shows an exploded view of an exemplary pin connector receptacle housing.

FIG. 11 shows an exploded view of an exemplary pin connector receptacle housing. The housing comprises top and bottom sections 40*a*, 40*b*, respectively. The pin connector housing is held in place in the multi-tap box 100 by two screws 43. The two slots 46, 47 on the sides of bottom section 40*b*, together with corresponding slots (unlabeled) on the top section 40*a*, form openings in the assembled pin connector housing 40 to accept coaxial connector pins 61 from either a side port (e.g. 10, 16) or a top port (e.g. 12, 14). A coaxial connector pin 61 fits into and is held captive by the pin connector 20.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

The invention claimed is:

1. A receptacle for receiving a coaxial cable pin connector pin, comprising:

a receptacle body having a cylindrical pin shaft and a hollow cylindrical base with four openings in a side wall of the cylindrical base, the openings being equally spaced about a perimeter of the cylindrical base and extending to a first end of the cylindrical base, a flexible connection plate located in the cylindrical base; and a connection plate cover located in the cylindrical base, wherein the connection plate has a first set of four tabs that fit into the four openings, the first set of four tabs being attached to a raised center portion, which is arranged to flex when a coaxial cable pin connector pin is inserted in one of the four openings and thereby urge the coaxial cable pin connector pin against the cylindrical base.

2. The receptacle for receiving a coaxial cable pin connector pin of claim 1, wherein the connection plate cover has a second set of four tabs that fit into the four openings.

3. The receptacle for receiving a coaxial cable pin connector pin of claim 1, wherein the four opening in the cylindrical base are U-shaped having an open end at the first end of the cylindrical base and a semi-circular end opposite the open end.

4. The receptacle for receiving a coaxial cable pin connector pin of claim 1, wherein the connection plate rests on a first set of four ledges in the cylindrical base interior.

5. The receptacle for receiving a coaxial cable pin connector pin of claim 4, wherein the connection plate cover rests on a second set of four ledges in the cylindrical base interior.

6. The receptacle for receiving a coaxial cable pin connector pin of claim 5, wherein the connection plate and the connection plate cover are held in place in the cylindrical base by a deformation of the cylindrical base first end.

7. The receptacle for receiving a coaxial cable pin connector pin of claim 5, wherein the connection plate and the connection plate cover are held in place in the cylindrical base by at least the connection plate cover being soldered to the cylindrical base.

8. The receptacle for receiving a coaxial cable pin connector pin of claim 1, wherein the connection plate is made of heat-treated beryllium copper.

9. The receptacle for receiving a coaxial cable pin connector pin of claim 1, wherein the connection plate cover tabs extend past the perimeter of the cylindrical base.

10. The receptacle for receiving a coaxial cable pin connector pin of claim 1, wherein the cylindrical pin shaft has a tapered end that is distal from the cylindrical base first end.

* * * * *